(12) United States Patent
DeKeuster et al.

(10) Patent No.: US 10,374,211 B2
(45) Date of Patent: Aug. 6, 2019

(54) SYSTEM AND METHOD FOR BATTERY MODULES HAVING TERMINAL BLOCK ASSEMBLIES WITH DRAINAGE CHANNELS

(71) Applicant: Johnson Controls Technology Company, Plymouth, MI (US)

(72) Inventors: Richard M. DeKeuster, Racine, WI (US); Robert J. Mack, Milwaukee, WI (US); John P. Dinkelman, South Milwaukee, WI (US)

(73) Assignee: CPS Technology Holdings LLC, New York, NY (US)

(*) Notice: Subject to any disclaimer, the term of this patent is extended or adjusted under 35 U.S.C. 154(b) by 284 days.

(21) Appl. No.: 15/263,065

(22) Filed: Sep. 12, 2016

(65) Prior Publication Data

US 2018/0076438 A1 Mar. 15, 2018

(51) Int. Cl.
*H01M 2/32* (2006.01)
*B29C 65/16* (2006.01)
(Continued)

(52) U.S. Cl.
CPC .............. *H01M 2/32* (2013.01); *B29C 65/16* (2013.01); *B29C 70/88* (2013.01); *H01M 2/0257* (2013.01); *H01M 2/1077* (2013.01); *H01M 2/206* (2013.01); *H01M 2/30* (2013.01); *H01M 2/305* (2013.01); *H01M 10/052* (2013.01); *H01M 10/058* (2013.01); *H01M 10/0525* (2013.01); *H01M 10/06* (2013.01); *H01M 10/625* (2015.04); *B29K 2023/12* (2013.01); *B29K 2105/06* (2013.01);
(Continued)

(58) Field of Classification Search
None
See application file for complete search history.

(56) References Cited

U.S. PATENT DOCUMENTS

| 4,350,746 A | * | 9/1982 | Chambers ........... H01M 2/1072 |
| | | | 429/121 |
| 5,941,719 A | | 8/1999 | Hayakawa |
| 6,787,698 B2 | | 9/2004 | Higuchi et al. |
| 7,064,519 B2 | | 6/2006 | Ito |

(Continued)

FOREIGN PATENT DOCUMENTS

WO 2013008460 A1 1/2013

OTHER PUBLICATIONS

PCT/US2017/042913 International Search Report and Written Opinion dated Oct. 5, 2017.

*Primary Examiner* — Carmen V Lyles-Irving
(74) *Attorney, Agent, or Firm* — Fletcher Yoder, P.C.

(57) ABSTRACT

The present disclosure relates generally to the field of batteries and battery modules, and more specifically, relates to a system and method for manufacturing terminal assemblies for lithium-ion battery modules. A disclosed battery module includes a terminal block assembly that is secured to a polymer housing of the battery module. The terminal block assembly includes a terminal post having a post portion and a base portion that extends outward from a central axis of the post portion. The terminal block assembly also includes a bus bar coupled to the base portion of the terminal post without welding, wherein the bus bar includes a trough disposed near the terminal post. The terminal block assembly further includes a polymer portion overmolding at least the trough of the bus bar to form a drainage channel near the terminal post.

15 Claims, 10 Drawing Sheets

(51) Int. Cl.

| | |
|---|---|
| *B29C 70/88* | (2006.01) |
| *H01M 2/10* | (2006.01) |
| *H01M 2/20* | (2006.01) |
| *H01M 2/30* | (2006.01) |
| *H01M 10/0525* | (2010.01) |
| *H01M 10/06* | (2006.01) |
| *H01M 2/02* | (2006.01) |
| *H01M 10/052* | (2010.01) |
| *H01M 10/058* | (2010.01) |
| *H01M 10/625* | (2014.01) |
| *B29K 23/00* | (2006.01) |
| *B29K 105/06* | (2006.01) |
| *B29L 31/34* | (2006.01) |
| *H01M 10/42* | (2006.01) |

(52) U.S. Cl.
CPC .......... *B29L 2031/3468* (2013.01); *H01M 2010/4271* (2013.01); *H01M 2220/20* (2013.01); *Y02T 10/7011* (2013.01)

(56) References Cited

U.S. PATENT DOCUMENTS

| | | |
|---|---|---|
| 7,378,179 B2 | 5/2008 | Shimamura et al. |
| 7,642,452 B2 | 1/2010 | Kanazawa et al. |
| 7,883,342 B2 | 2/2011 | Yoshida et al. |
| 8,394,521 B2 | 3/2013 | Umemoto et al. |
| 9,034,496 B2 | 5/2015 | Adachi et al. |
| 2004/0214458 A1 | 10/2004 | Maebashi |
| 2010/0173190 A1 | 7/2010 | Tsuchiya |
| 2012/0045667 A1 | 2/2012 | Yoneda et al. |
| 2012/0295150 A1* | 11/2012 | Gao .............. H01M 2/021 429/158 |
| 2013/0040177 A1 | 2/2013 | Hashio et al. |
| 2013/0234511 A1 | 9/2013 | Murata |
| 2014/0127551 A1 | 5/2014 | Kim |
| 2014/0308552 A1 | 10/2014 | Kim et al. |
| 2015/0340745 A1 | 11/2015 | Inoue |
| 2016/0133896 A1 | 5/2016 | Baek et al. |
| 2016/0197320 A1 | 7/2016 | Mack et al. |
| 2016/0197328 A1 | 7/2016 | Mack et al. |
| 2016/0226347 A1 | 8/2016 | Okamoto et al. |
| 2017/0125862 A1* | 5/2017 | DeKeuster ........ H01M 10/6551 |

\* cited by examiner

SYSTEM AND METHOD FOR BATTERY MODULES HAVING TERMINAL BLOCK ASSEMBLIES WITH DRAINAGE CHANNELS

CROSS REFERENCE TO RELATED APPLICATIONS

This application is related to U.S. patent application Ser. No. 15/158,321, entitled "SYSTEM AND METHOD OF OVERMOLDED TERMINAL POSTS OF A BATTERY MODULE," filed May 18, 2016, and U.S. patent application Ser. No. 15/226,646, entitled "SYSTEMS AND METHODS FOR BONDING METAL PARTS TO THE POLYMER PACKAGING OF A BATTERY MODULE," filed Aug. 2, 2016, which are hereby incorporated by reference in their entireties for all purposes.

BACKGROUND

The present disclosure relates generally to the field of batteries and battery modules. More specifically, the present disclosure relates to a system and method for manufacturing terminal assemblies for lithium-ion battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include complicated electrical coupling between the electrochemical cells and the terminal posts of the battery module. Additionally, since the terminal posts extend though a portion of the packaging of the battery modules, it is desirable to have a terminal post design that blocks the entry of water or debris into the packaging of the battery module.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module that includes a terminal block assembly that is secured to a polymer housing of the battery module. The terminal block assembly includes a terminal post having a post portion and a base portion that extends outward from a central axis of the post portion. The terminal block assembly also includes a bus bar coupled to the base portion of the terminal post without welding, wherein the bus bar includes a trough disposed near the terminal post. The terminal block assembly further includes a polymer portion overmolding at least the trough of the bus bar to form a drainage channel near the terminal post.

The present disclosure also relates to a method of manufacturing a battery module. The method includes disposing a post portion of a terminal post through an opening in a bus bar, wherein the bus bar comprises a trough disposed near the opening in the bus bar, and bending one or more flaps of the bus bar around a base portion of the terminal post to secure the terminal post to the bus bar without welding. The method includes overmolding polymer about a portion of the bus bar and terminal post to yield a terminal block assembly, wherein the portion includes the trough of the bus bar to form a drainage channel of the terminal block assembly. The method also includes disposing the terminal block assembly in a receptacle of a polymer housing of the battery module. The method further includes electrically coupling the terminal block assembly to a power assembly of the battery module, and sealing the terminal block assembly within the receptacle of the polymer housing of the battery module.

The present disclosure also relates to a battery module having a power assembly that includes a plurality of lithium-ion battery cells. The battery module has a first terminal block assembly that includes a first terminal post having a post portion and a base portion that extends outward from a central axis of the post portion. The first terminal block assembly includes a first bus bar coupled to the base portion of the first terminal post without welding to form a first electrical assembly, wherein the first bus bar includes a trough disposed near the first terminal post, and wherein the first electrical assembly is electrically coupled to the power assembly of the battery module. The first terminal block assembly also includes a first polymer portion overmolding at least a portion of the first electrical assembly, wherein the portion comprises the trough of the first bus bar and forms a first drainage channel near the first terminal post. The battery module also includes a polymer housing including a first receptacle that is welded to the first polymer portion of the first terminal block assembly.

DRAWINGS

Various aspects of this disclosure may be better understood upon reading the following detailed description and upon reference to the drawings in which.

DETAILED DESCRIPTION

Figure 1:
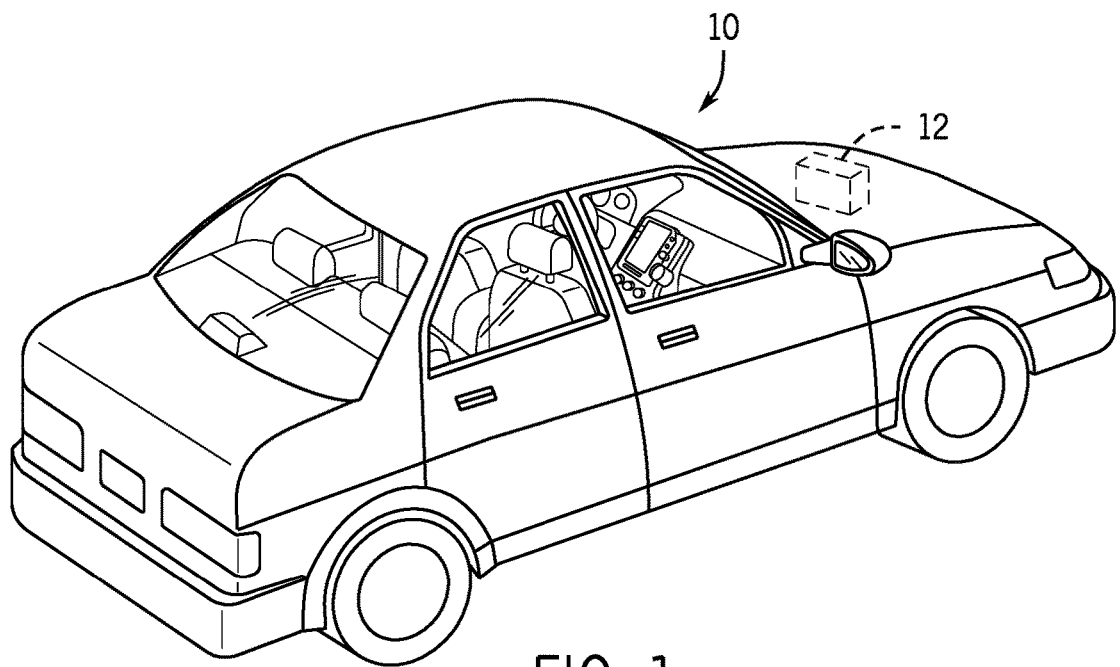
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, individual electrochemical cells may be positioned in a housing of the battery module, and terminals (e.g., minor terminals or cell terminals) of the electrochemical cells may generally extend outwardly from the electrochemical cells within the housing. To couple the electrochemical cells together (e.g., in series or parallel), an electrical path between minor terminals of two or more electrochemical cells may be established by coupling together minor terminals of the electrochemical cells to form a power assembly. Further, two of the electrochemical cells (e.g., on either end of the battery module or on ends of one or more stacks of electrochemical cells) of the power assembly may be electrically coupled to major terminals (e.g., module terminals, primary terminals, terminal posts) of the battery module via corresponding bus bars, or via corresponding bus bar assemblies, where the major terminals are configured to be coupled to a load for powering the load.

In traditional configurations, to ensure that the major terminals and their associated bus bars do not become decoupled, the major terminals and the bus bars are generally welded together. However, welding of the major terminal and the bus bar generally requires that the material of the bus bar is the same as the material of the major terminal, or at least that the two materials are compatible for welding. Further, the material of the bus bars may depend on the material of the corresponding minor terminals (e.g., of the electrochemical cells) or the material of one or more intervening components (e.g., a shunt coupled to a printed circuit board). This may increase a material cost of the battery module and complexity of manufacturing. Further, associated geometries, assemblies, and welding techniques for traditional configurations, such as those described above, may contribute to a volume of the battery module, thereby reducing an energy density of the battery module.

To address these and other shortcomings of traditional battery module configurations, battery modules in accordance with the present disclosure include at least one terminal block assembly. The terminal block assembly generally has an electrical assembly that includes a terminal post and a bus bar that can be coupled together without welding, enabling the two components to be made from similar or dissimilar materials. Further, portions of the electrical assembly are overmolded by polymer to form the disclosed terminal block assembly. The terminal block assembly is designed to be received by a receptacle or cavity in a polymer housing of the battery module. Subsequently, the polymer portion of the terminal block assembly can be sealed (e.g., welded, adhered) to the housing to block leakage of electrolyte from the housing and/or leakage of moisture or fluid into the housing.

Furthermore, additional features are included in the design of the disclosed terminal block assembly to block and redirect the flow of fluids (e.g., water) from entering the housing near the terminal post. For example, as discussed in detail below, the disclosed bus bar includes a trough feature (e.g., a U-shaped bend, similar in shape to a p trap) disposed near the terminal post. In certain embodiments, once the polymer portion of the terminal block assembly is secured to the housing, the trough forms a drainage channel that directs fluids that contact the exterior of the housing, near the terminal post, to drain instead of remaining (e.g., collecting, pooling) near the major terminal of the battery module. As such, by enabling fluids to drain away from the major terminals, the presently disclosed terminal block assembly design enables the manufacture of battery modules that are better protected from fluids entering the housing of the battery module, and provide better protection of the major terminal (and any associated electrical connections) from corrosion that is encouraged by fluid or moisture collecting near the major terminal. Additionally, the curvature (e.g., U-shaped bends, S-shaped curvature) of the disclosed bus bar further provides a tortuous path that blocks (e.g., prevents, resists) undesired environmental factors (e.g., fluids, water, air, corrosion) from traversing (e.g., wicking) along the surface of bus bar and into the packaging of the battery module. These and other features will be described in detail below with reference to the figures.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
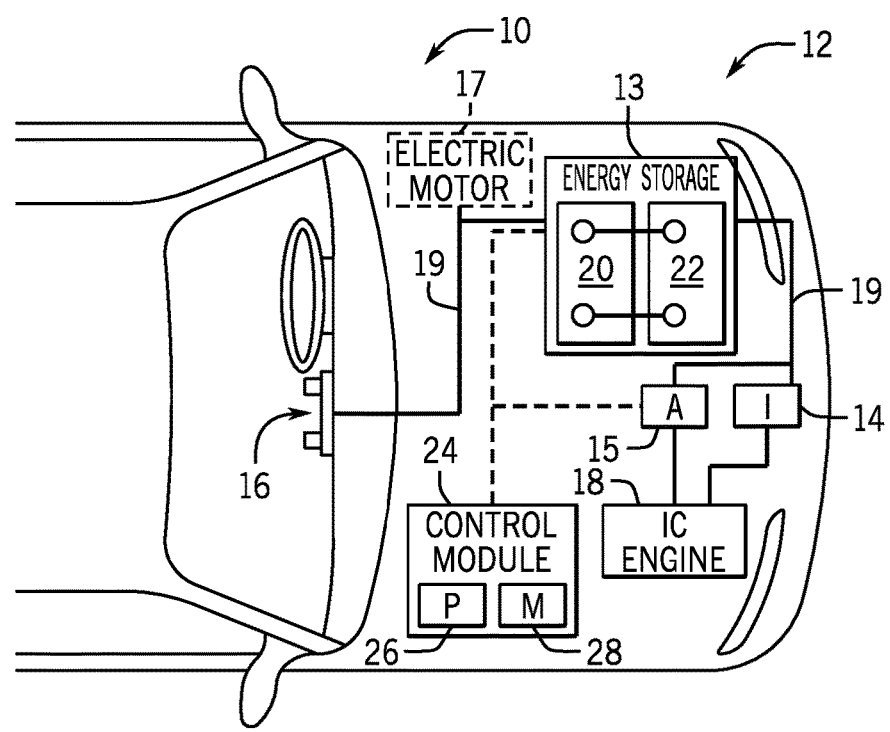
FIG. 2 is a cutaway schematic view of an embodiment of the vehicle and the battery system of FIG. 1, in accordance with embodiments of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
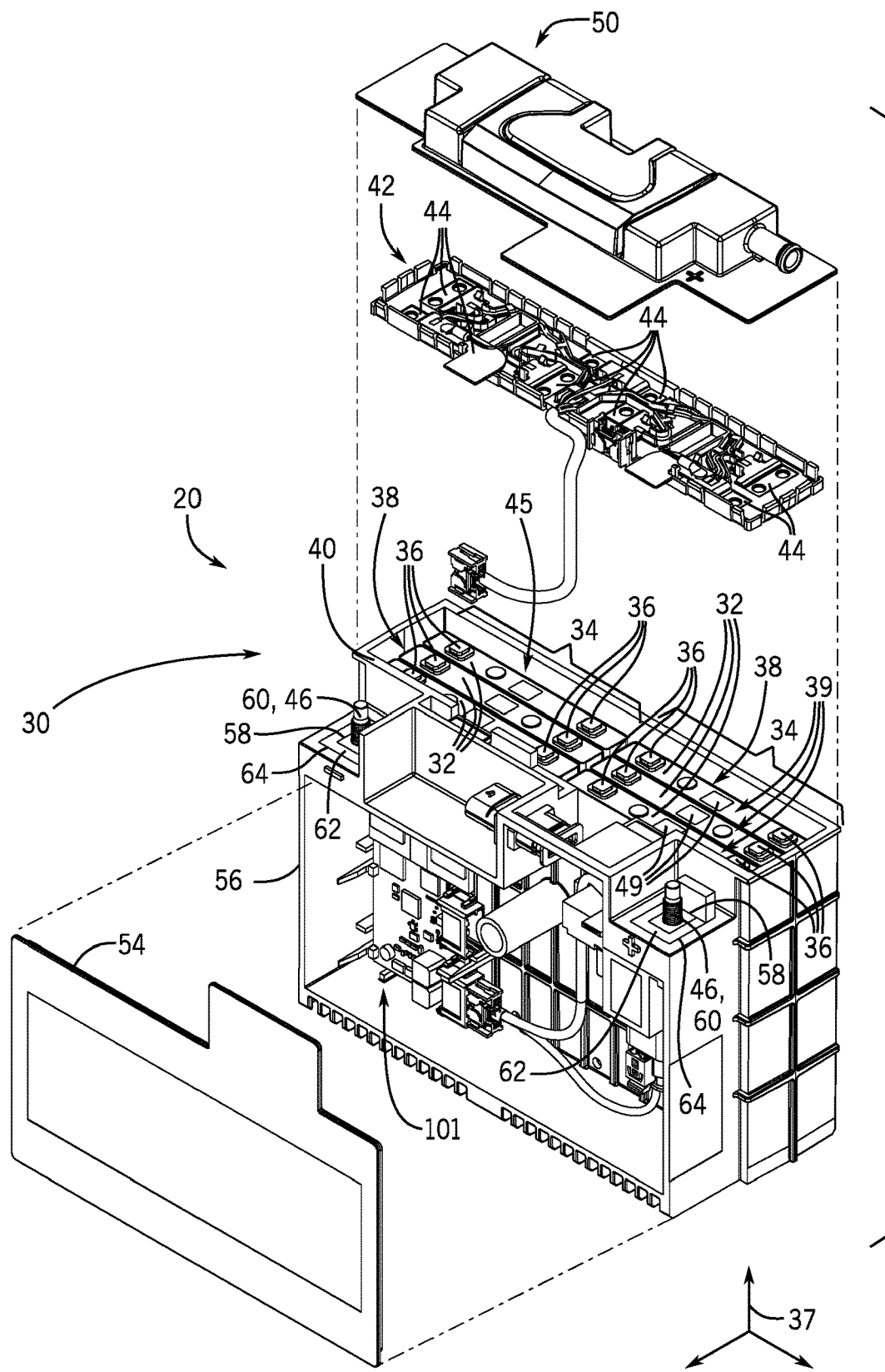
FIG. 3 is an exploded perspective view of an embodiment of a battery module for use in the battery system of FIG. 1, in accordance with embodiments of the present disclosure.

An overhead exploded perspective view of an embodiment of the battery module 20 for use in the vehicle 10 of FIG. 2 is shown in FIG. 3. In the illustrated embodiment, the battery module 20 (e.g., lithium-ion [Li-ion] battery module) includes a polymer housing 30 and electrochemical cells 32 (e.g., prismatic lithium-ion [Li-ion] electrochemical cells) disposed inside the housing 30. In the illustrated embodiment, six prismatic Li-ion electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 (e.g., cell terminals, minor terminals) extending upwardly (e.g., in direction 37) from terminal ends 39 of the electrochemical cells. Accordingly, the terminals 36 may extend into an opening 38 disposed in an upper side 40 or face of the housing 30. For example, the electrochemical cells 32 may be inserted into the housing 30 through the opening 38 in the upper side 40, and positioned within the housing 30 such that the terminals 36 of the electrochemical cells 32 are disposed in the opening 38. A bus bar carrier 42 may be disposed into the opening 38 and may retain minor bus bars 44 (e.g., cell-to-cell bus bars, terminal bus bars) disposed thereon and configured to interface with the terminals 36 of the electrochemical cells 32. For example, the minor bus bars 44 may interface with the terminals 36 to electrically couple adjacent electrochemical cells 32 together (e.g., to form power assembly 45 of electrically interconnected electrochemical cells 32). The minor bus bars 44 may be mounted or disposed on or proximate to a top or a bottom face or surface of the bus bar carrier 42 (e.g., facing away from the electrochemical cells 32 or facing the electrochemical cells 32). However, in other embodiments, the battery module 20 may not include the bus bar carrier 42 and the minor bus bars 44 may be disposed directly onto the terminals 36.

Depending on the embodiment, the minor bus bars 44 may couple the electrochemical cells 32 in series, in parallel, or some of the electrochemical cells 32 in series and some of the electrochemical cells 32 in parallel to form the power assembly 45 of the battery module 20. Further, certain of the minor bus bars 44 may be configured to enable electrical coupling of the group of electrically interconnected electrochemical cells 32 with major terminals 46 (e.g., module terminals, terminal posts) of the battery module 20, where the major terminals 46 are configured to be coupled to a load (e.g., component(s) of the vehicle 10 of FIGS. 1 and 2) to power the load. A cover 50 (which may be a part of the housing 30 or may be a separate component) may be disposed over the bus bar carrier 42 to seal the opening 38 in the housing 30 of the battery module 20 and/or to protect the minor bus bars 44, other components disposed on the bus bar carrier 42, and/or other components of the battery module 20. Further, a panel 54 may be disposed over an adjacent side 56 (e.g., a side adjacent to the region of the housing 30 retaining the electrochemical cells 32) of the housing 30 to protect other components (e.g., electrical components) fixed to the adjacent side 56 of the housing 30.

As previously described, each of the major terminals 46 of the illustrated battery module 20 is a terminal block assembly 58 that is respectively electrically coupled to the power assembly 45 to deliver a suitable positive or negative voltage to an attached load. While the structure of the terminal block assembly 58 is discussed in greater detail below, the terminal post 60 of the terminal block assembly 58 is electrically coupled to the power assembly 45 via a bus bar (not shown) of the terminal block assembly 58. Further, a polymer portion 62 of each terminal block assembly 58 is secured (e.g., sealed, adhered, welded) to a respective receptacle 64 to form a water-tight polymer housing 30. These and other features of the terminal block assembly 58 and the receptacles 64 of the housing 30 will be described in detail below.

Figure 4:
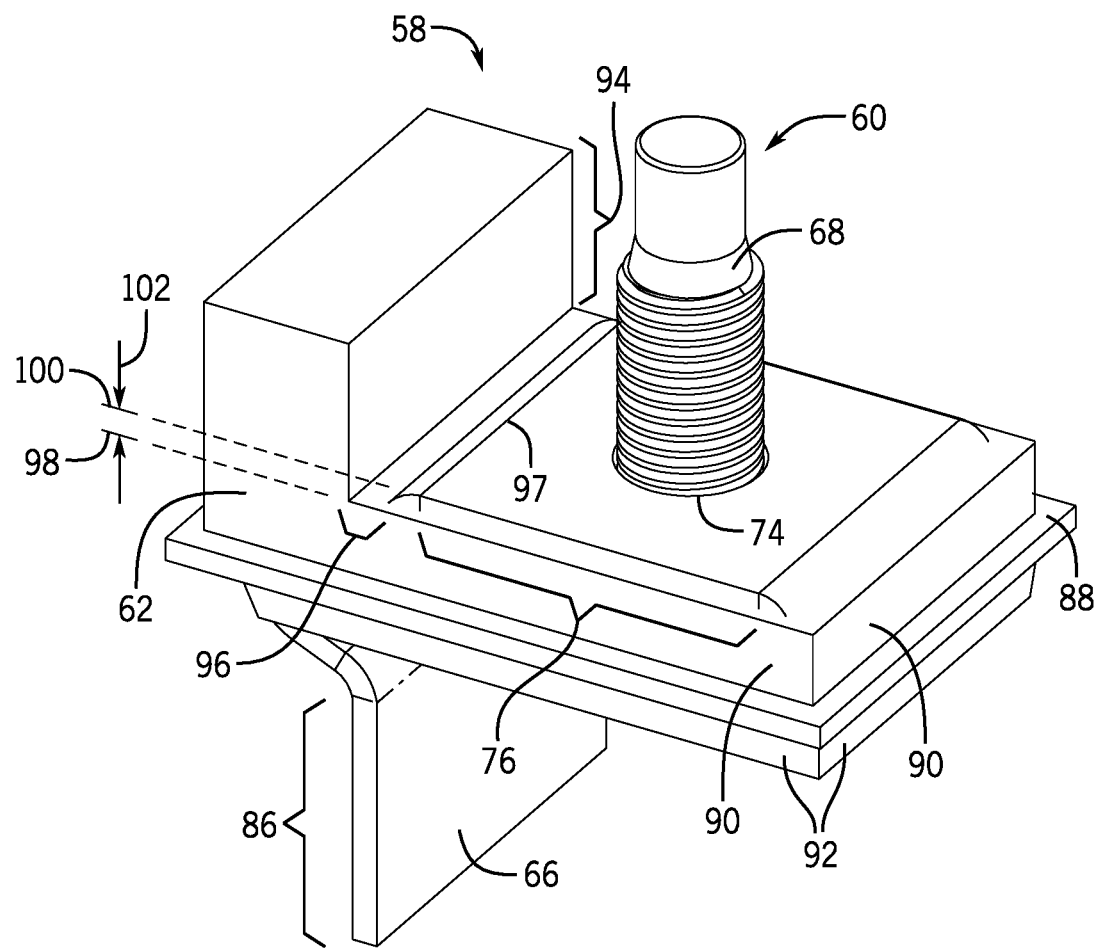
FIG. 4 is a perspective view of an embodiment of a terminal block assembly designed to be sealed into a receptacle of a housing of the battery module of FIG. 3, in accordance with embodiments of the present disclosure.
Figure 5:
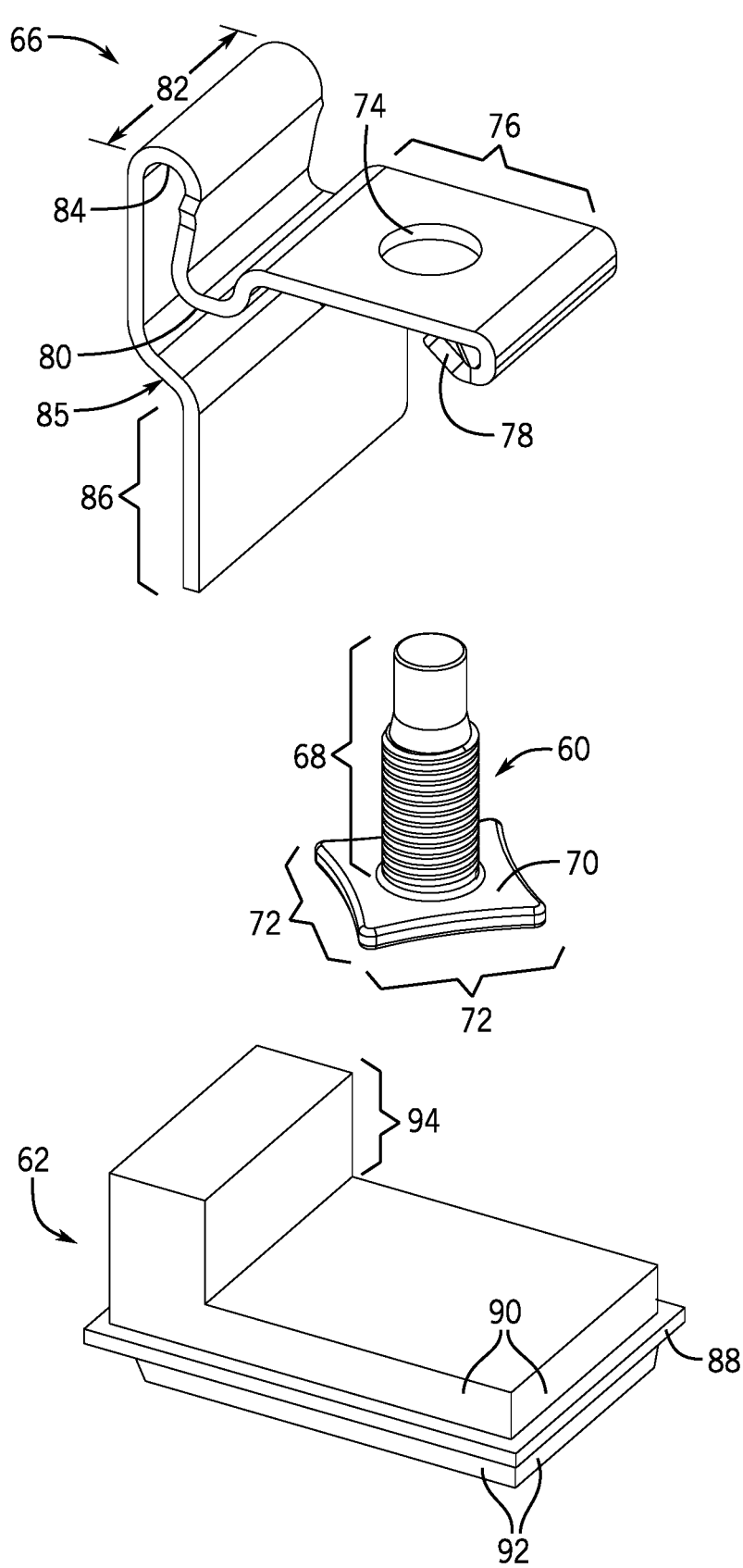
FIG. 5 is an exploded perspective view of the terminal block assembly illustrated in FIG. 4, in accordance with embodiments of the present disclosure.

With the foregoing in mind, FIG. 4 is a perspective view of an embodiment of the terminal block assembly 58, in accordance with embodiments of the present disclosure. To better illustrate the individual components, FIG. 5 is an exploded view of the terminal block assembly 58 illustrated in FIG. 4, which enables a clearer view of the terminal post 60, the bus bar 66, and the polymer portion 62. As discussed in greater detail below, the terminal block assembly 58 is designed to be inserted and sealed into the receptacle 64 of the housing 30 to serve as a major terminal 46 (e.g., a positive terminal, a negative terminal) of the battery module 20 of FIG. 3.

For the embodiment illustrated in FIGS. 4 and 5, the terminal block assembly 58 includes a metallic terminal post 60 having a post portion 68 and a base portion 70. In certain embodiments, the terminal post 60 may be made from copper, aluminum, nickel, stainless steel, or combinations thereof. In the illustrated embodiment, the base portion 70 is generally axially aligned along a shared axis with the post portion 68 and positioned at an end of the post portion 68. The base portion 70 has a perimeter (e.g., defined by sides 72 of the base portion 70) that is generally greater than (e.g., extends beyond) a circumference of the post portion 68. In certain embodiments, the base portion 70 may be integrally formed with the post portion 68 of the terminal post 60. In some embodiments, the base portion 70 and the post portion 68 may be separate components that are welded or otherwise joined together (e.g., by screwing the post portion 68 into a threaded opening in the base portion 70). The illustrated base portion 70 of the terminal post 60 may be described as having a superellipsoid shape (e.g., a square shape having slightly concave sides that curve inwardly, towards the central axis of the post portion 68). In other embodiments, the base portion 70 may have other cross-sectional shapes (e.g., triangular, square, hexagonal), in accordance with the present disclosure. The post portion 68 of the terminal post 60 illustrated in FIGS. 4 and 5 provides a threaded, male connection that is designed to receive a threaded, female electrical connector (not shown) to couple the battery module 20 to a load. In other embodiments, the terminal post 60 may include a different connector (e.g., a threaded, female connector; a smooth post connector; a flange connector) to enable connections to other types of electrical connectors, in accordance with the present disclosure.

The illustrated terminal block assembly 58 also includes a bus bar 66 that is physically and electrically coupled to the terminal post 60. In certain embodiments, the bus bar 66 may be made of copper, aluminum, nickel, stainless steel, or combinations thereof. As mentioned above, in certain embodiments, the bus bar 66 and the terminal post 60 may be made of similar or dissimilar metals. As discussed in greater detail below, the post portion 68 of the terminal post 60 extends through an opening 74 in a base 76 of the bus bar 66, while the base portion 70 of the terminal post 60 is secured to the bus bar 66 via flaps 78 of the bus bar 66. As shown in FIG. 5, the illustrated bus bar 66 also includes a trough 80 (e.g., a U-shaped bend along a width 82 of the bus bar 66) disposed adjacent to the base 76 of the bus bar 66, near the terminal post 60, that extends below the plane of the base 76 of the bus bar 66. Additionally, the bus bar 66 also includes a hair-pin bend 84 (e.g., an elongated U-shaped bend along the width 82 of the bus bar 66) that extends in a direction opposite the trough (e.g., above the plane of the base 76 of the bus bar 66). Further, the illustrated bus bar 66 also includes a small bend 85 (e.g., an S-shaped bend) that extends along the width 82 of the bus bar 66, separating an extension 86 from the remainder of the bus bar 66.

Additionally, the illustrated terminal block assembly 58 includes a polymer portion 62 that overmolds portions of the bus bar 66 and the terminal post 60. In certain embodiments, the polymer portion 62 may be made of polypropylene, polypropylene with glass fiber, nylon (e.g., Nylon 66), or another suitable polymer. As illustrated in FIG. 4, the polymer portion 62 overmolds a substantial portion of the bus bar 66, which electrically isolates these overmolded portions to block undesired electrical connections with the bus bar 66. However, an extension 86 of the bus bar 66 of the terminal block assembly 58 remains exposed to enable the bus bar 66 to be electrically coupled (e.g., directly or indirectly) to the power assembly 45 of the battery module 20 to provide an appropriate voltage to the terminal post 60 for coupling to a suitable load. It may be appreciated that, in certain embodiments, the extension 86 of the bus bar may have additional features (e.g., curves or bends) to allow the bus bar 66 to electrically couple to the power assembly 45. Additionally, as illustrated, the polymer portion 62 may not cover the base 76 of the bus bar 66, such that the base 76 of the bus bar 66 is exposed around the opening 74 in the bus bar 66 through which the post portion 68 of the terminal post 60 extends. For example, in certain embodiments, a connector (e.g., a threaded, female connector) may be completely tightened on the terminal post 60 until it is in physical and electrical contact with the base 76 of the bus bar 66, as opposed to the terminal post 60 alone.

The polymer portion 62 of the terminal block assembly 58 is illustrated as having a substantially rectangular cross-section, which is designed to facilitate insertion of the terminal block assembly 58 into the substantially rectangular receptacle 64 of the housing 30 of the battery module 20 illustrated in FIG. 3. Additionally, the polymer portion 62 includes a lip 88 that extends outwardly from sides 90 of the polymer portion 62 of the terminal block assembly 58, which are designed to contact and seal (e.g., weld, adhere) to an exterior portion of the receptacles 64 of the housing 30 to secure the terminal block assembly 58 to the housing 30. Further, it may be appreciated that the illustrated embodiment of the terminal block assembly 58 includes tapered (e.g., beveled) side portions 92 disposed below the lip 88. As such, for certain embodiments, these tapered side portions 92 may correspond to oppositely (e.g., complimentary) tapered side portions (not shown) of the receptacles 64 of the housing, to further enable a secure fit between the terminal block assembly 58 and the receptacles 64 of the housing 30.

Furthermore, as illustrated in FIG. 4, the polymer portion 62 of the terminal block assembly 58 overmolds both the trough 80 and the hair-pin bend 84 of the bus bar 66. As illustrated, once the polymer portion 62 of the terminal block assembly 58 overmolds these features, the hair-pin bend 84 is disposed below a rectangular portion 94 of the polymer portion 62. It may be appreciated that, in other embodiments, this rectangular portion 94 may have more of a rounded shape (e.g., like the shape of the underlying hair-pin bend 84).

As illustrated in FIG. 4, the trough 80 of bus bar 66, once overmolded with the polymer portion 62, forms a drainage channel 96 of the terminal block assembly 58. The drainage channel 96 is generally disposed adjacent to the base 76 of the bus bar 66, near the post portion 68 of the terminal block assembly 58, and defines an elevation 98 (e.g., maximum height) that is less than an elevation 100 (e.g., maximum height) of the plane of the base 76 of the bus bar 66 of the terminal block assembly 58. The drainage channel 96 may also be described as being disposed adjacent to the interface 97, where the polymer portion 62 meets the exposed surface of the base 76 of the bus bar 66, and promotes the drainage of fluids (e.g., water) from the sides 90 of the terminal block assembly 58 rather than allowing the fluid to collect at this interface 97. For the embodiment of the terminal block assembly 58 illustrated in FIGS. 4 and 5, the drainage channel 96 extends at least a small distance 102 (e.g., between approximately 0.1 mm and approximately 5 mm, between 1 mm and 2 mm) below the plane of the base 76 of the bus bar 66 to promote drainage of fluids away from the terminal post 60. Additionally, in the event that a fluid (e.g., water) leaks past the polymer/terminal interface, the trough 66 may trap or direct the fluid in a direction away from the electrochemical cells 32 and/or any underlying supporting electronic circuitry 101 (e.g., control switches, control/monitoring circuitry, power conversion circuitry) disposed near the major terminals 46 of the battery module 20 (as illustrated in FIG. 3). In other embodiments, less of the trough 80 illustrated in FIG. 5 may be overmolded by the polymer portion 62 to yield a drainage channel 96 that is a greater distance below (e.g., lower elevation than) the plane of the base 76. Furthermore, in certain embodiments, the polymer portion 62 may conformally coat the trough 80 of the bus bar 66 illustrated in FIG. 5 to yield a drainage channel 96 that has a similar dimensions and shape (e.g., similar width, depth, and curvature) as the trough 80 of the bus bar. Additionally, as discussed below, while certain embodiments of the disclosed terminal block assembly 58 may lack the illustrated drainage channel 96, it should be appreciated that the curvature of the bus bar 66 provides a tortuous path that blocks (e.g., resists, prevents) corrosion or unwanted contaminants (e.g., water, air, fluid) from creeping along the bus bar 66 and into the polymer housing 30 of the battery module 20.

Figure 6:
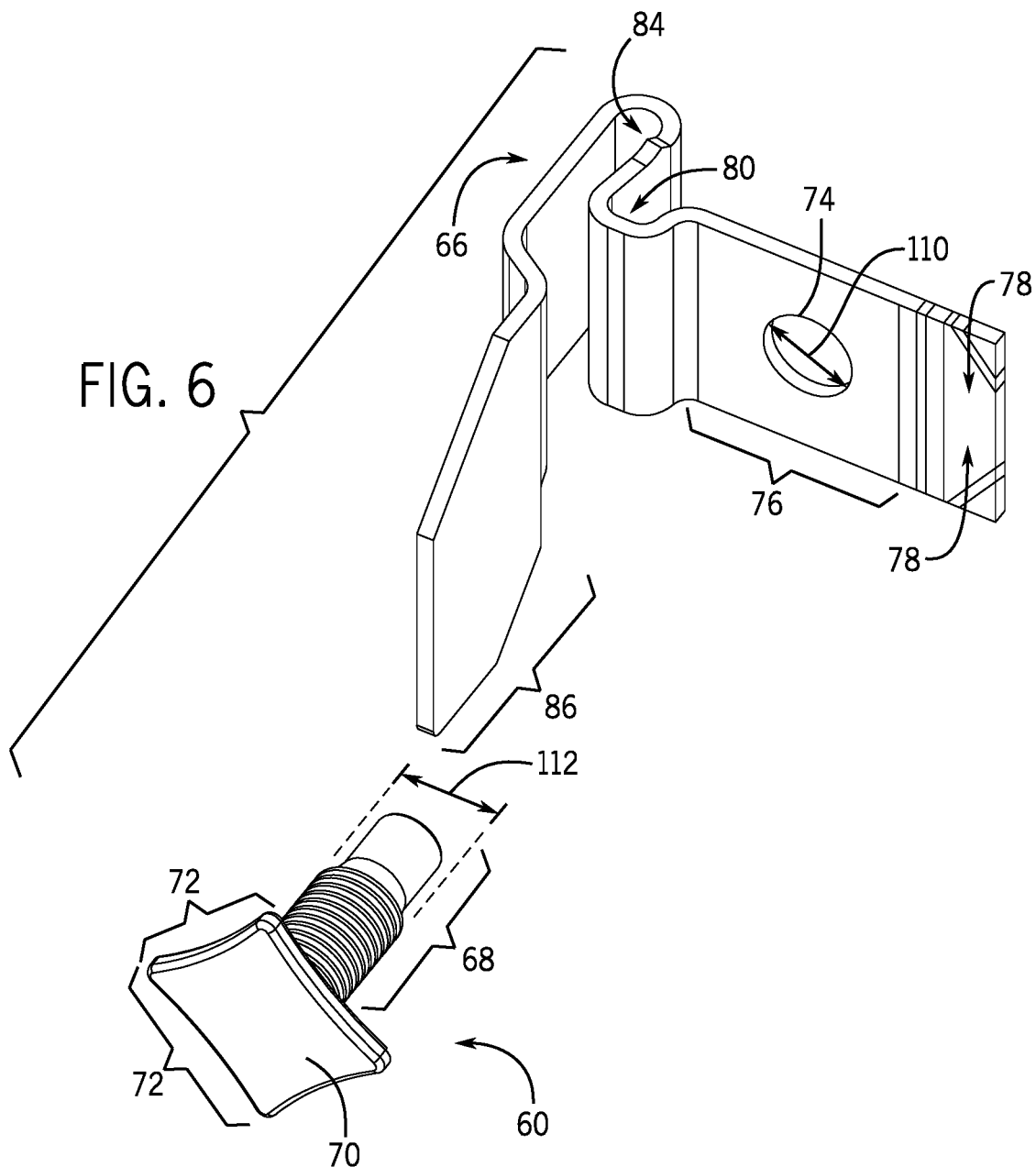
FIG. 6 is a bottom perspective view of a bus bar and terminal post of a terminal block assembly before the terminal post is secured to the bus bar, in accordance with embodiments of the present disclosure.

FIG. 6 is a perspective view of the bus bar 66 and the terminal post 60 for the embodiment of the terminal block assembly 58 illustrated in FIGS. 4 and 5 before the terminal post 60 is secured to the bus bar 66. As mentioned above, the base 76 of the bus bar 66 defines an opening 74 that enables the post portion 68 of the terminal post 60 to extend or pass through the base 76 of the bus bar 66. For example, the opening 74 may include a diameter 110 that is approximately equal to, or slightly larger than, a maximum diameter 112 of the post portion 68 of the terminal post 60. The bus bar 66 also includes flaps 78 that are designed to be folded around certain sides 72 (e.g., perimeter) of the base portion 70 of the terminal post 60. For example, as set forth in detail below, the flaps 78 may fold around the sides 72 (e.g., perimeter) of the base 76 to envelop the base 76 within a pocket of the bus bar 70.

Figure 7:
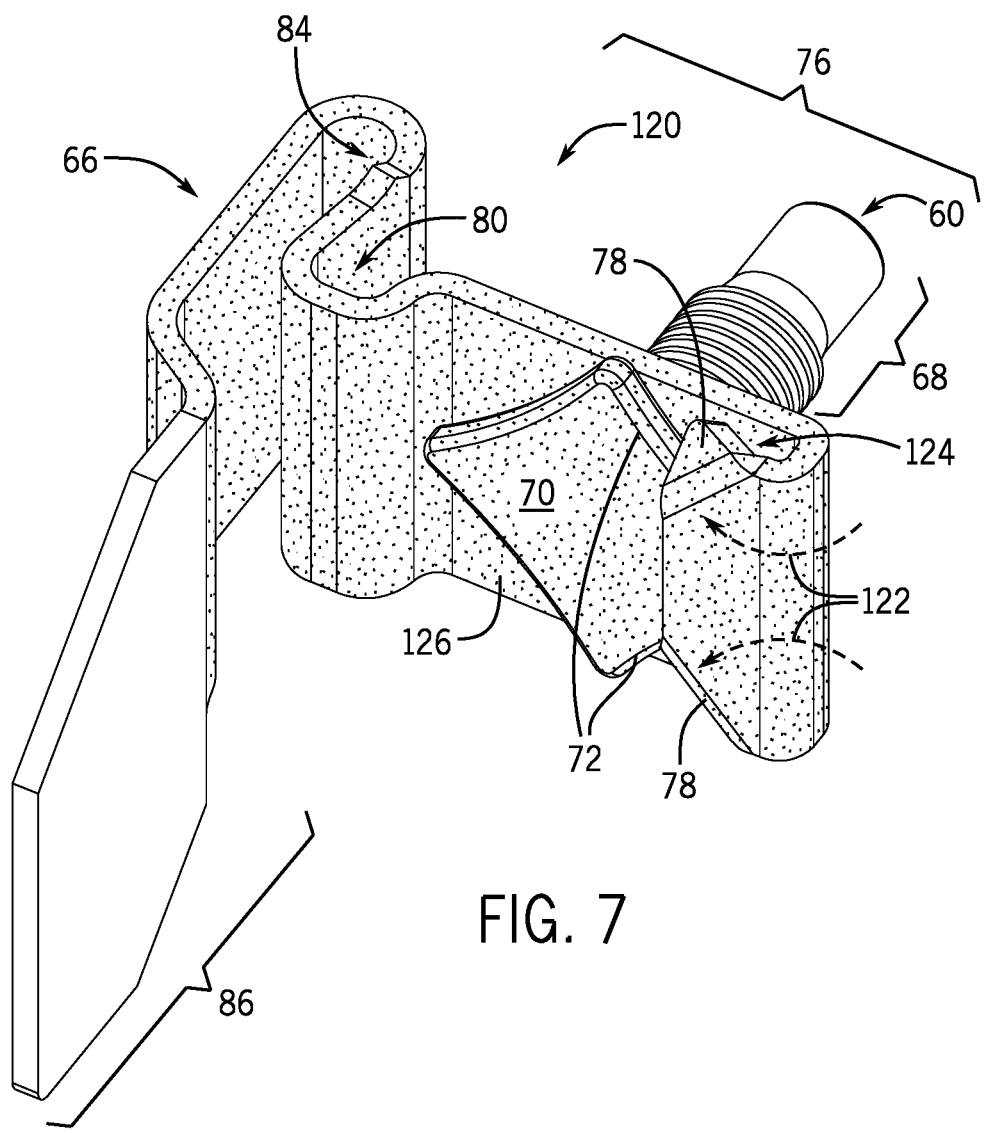
FIG. 7 is a bottom perspective view of an electrical assembly of the terminal block assembly in which the flaps of the bus bar have been folded to secure a base portion of the terminal post within a pocket of the bus bar, in accordance with embodiments of the present disclosure.

FIG. 7 is a perspective view of the bus bar 66 and the terminal post 60 illustrated in FIG. 6 after the terminal post 60 is secured to the bus bar 66 to form an electrical assembly 120 of the terminal block assembly 58. Starting from the arrangement illustrated in FIG. 6, first the post portion 68 of the terminal post 60 is inserted (e.g., passed, threaded) through the opening 74 in the base 76 of the bus bar 66 until the base portion 70 of the terminal post 60 is substantially flush with the underside of the base 76 of the bus bar 66. Subsequently, as illustrated in FIG. 7, the flaps 78 of the bus bar 66 may be wrapped around the base portion 70 of the terminal post 60, as indicated by arrows 122, to envelop or retain the base portion 70 within a pocket 124 of the bus bar 66). For example, in certain embodiments, the flaps 78 may be heated to enhance pliability and enable wrapping of the flaps 78 around the base portion 70 of the terminal post 60, thereby enabling the electrical assembly 120 (i.e., the bus bar 66 and the terminal post 60) to be electrically connected without negatively affecting the integrity of the bus bar 66, and without requiring that the bus bar 66 and the terminal post 66 be welded to one another. Alternatively, in certain embodiments, the flaps 78 may be wrapped around the base portion 70 of the terminal post 60 via a cold forming process in which the bus bar 66 is lubricated, the base portion 70 of the terminal post 60 is positioned proximate to the underside of the base 76 of the bus bar 66, and the bus bar 66 is pushed or pulled through an opening in a cold forming molding component that causes (e.g., forces, drives) the flaps 78 to bend around the base portion 70 of the terminal post 60, thereby enveloping the base portion 70 via the pocket 124 of the bus bar 66. In certain embodiments, the flaps 78 of the bus bar 66 may be stamped, pressed, or maneuvered in some other manner in place around the base portion 70 of the terminal post 60.

In certain embodiments, portions of the electric assembly 120, including the bus bar 66 and/or the terminal post 60, may receive microsurface treatment on at least a bonding surface of the electrical assembly 120 to enhance the surface roughness prior to overmolding this bonding surface with the polymer portion 62 of the terminal block assembly 58. As used herein, the "bonding surface," with respect to the bus bar 66 and/or the terminal post 60, refers to the portion of the surface of the metal part that directly contacts and bonds to (e.g., adheres to, seals to) the overmolded polymer portion 62 of the terminal block assembly 58. As used herein, "microsurface modification," "microsurface treatment," or "microsurface roughening" generally refer to surface treatment that introduces micron-scale and/or sub-micron-scale (e.g., nano-scale) deformities (e.g., edges, pits, peaks, ridges, troughs), generally referred to herein as "microsurface roughness," into at least the bonding surface of the electrical assembly 120, to increase the surface roughness/surface area of the treated surface. It is presently recognized that this microsurface treatment substantially improves bonding and sealing of the electrical assembly 120 that are overmolded into a portion of the packaging of a battery module. As such, the present technique is especially applicable to certain metal parts, such as portions of the electrical assembly 120, that extend all the way through a portion of the polymer packaging 30 and, therefore, risk of compromising the desired water-tight sealing of the packaging 30 of the battery module 20.

In certain embodiments, the entire surface of the electrical assembly 120 may receive the microsurface treatment, before or after securing the terminal post 60 within the pocket 124 of the bus bar 66. In other embodiments, only the bonding surface 126 (represented by the speckled texture) of the electrical assembly 120 may selectively receive the microsurface treatment, before or after securing the terminal post 60 within the pocket 124 of the bus bar 66. In still other embodiments, the electrical assembly 120 may not receive the microsurface treatment before overmolding. It may be appreciated that, in certain embodiments, the microsurface treatment may also be applied to at least portions of the surface of a metal strip before the strip is shaped (e.g., stamped, pressed, bent, welded) to form the bus bar 66. Similarly, in certain embodiments, the base portion 70 may receive the microsurface treatment before being coupled to the post portion 68 to form the terminal post 60.

In certain embodiments, the etchant for the microsurface treatment may include an acid, such as hydrochloric acid, sulfuric acid, acetic acid, nitric acid, hydrofluoric acid, or mixtures thereof. In other embodiments, the bonding surface 126 of the electrical assembly 120 may be roughened by laser etching, wherein electromagnetic radiation serves as the etchant. In general, the etchant may be any etchant that provides suitable micron-scale and/or sub-micron scale (e.g., nano-scale) features that substantially increase the micron-scale roughness of the exposed surface of the electrical assembly 120. For laser etching in particular, it may be easier to control which portions of the electrical assembly 120 are contacted by the etchant via control of the laser, which may, for example, enable selective microsurface treatment of only the bonding surface 126 of the electrical assembly 120 without the use of a mask. In other embodiments, a mask that is generally inert to the etchant may be temporarily disposed over portions of the electrical assembly 120 before the microsurface roughness treatment to shield the underlying portions of the electrical assembly 120 from being roughened by the treatment.

It is also presently recognized that, in certain embodiments, the roughening effect provided by the microsurface treatment may be short-lived (e.g., hours to days or weeks) before the microsurface features are substantially eroded, likely due to slow oxidation of the microsurface features. Accordingly, in certain embodiments, it may be desirable for the electrical assembly 120 to be overmolded within a predetermined amount of time (e.g., on the order of minutes to hours, or days to weeks) of the bus bar 66 and/or the terminal post 60 receiving the microsurface treatment. Additionally, it may be appreciated that, even if the non-bonding surface of the electrical assembly 120 is roughened by the microsurface treatment, the bonding surface that is buried under the polymer portion 62 during overmolding remains in a substantially roughened state, while the microsurface features added to the remainder of the surface of the electrical assembly 120 may gradually erode over time. As such, since masking the electrical assembly 120 adds additional cost, time, and complexity to the microsurface treatment process, in certain embodiments, it may be more cost-effective to roughen the entire surface of the electrical assembly 120, overmold the bonding surface of the electrical assembly with the polymer portion 62, and allow the roughness on the remainder of the surface of the electrical assembly 120 to gradually fade.

Figure 8:
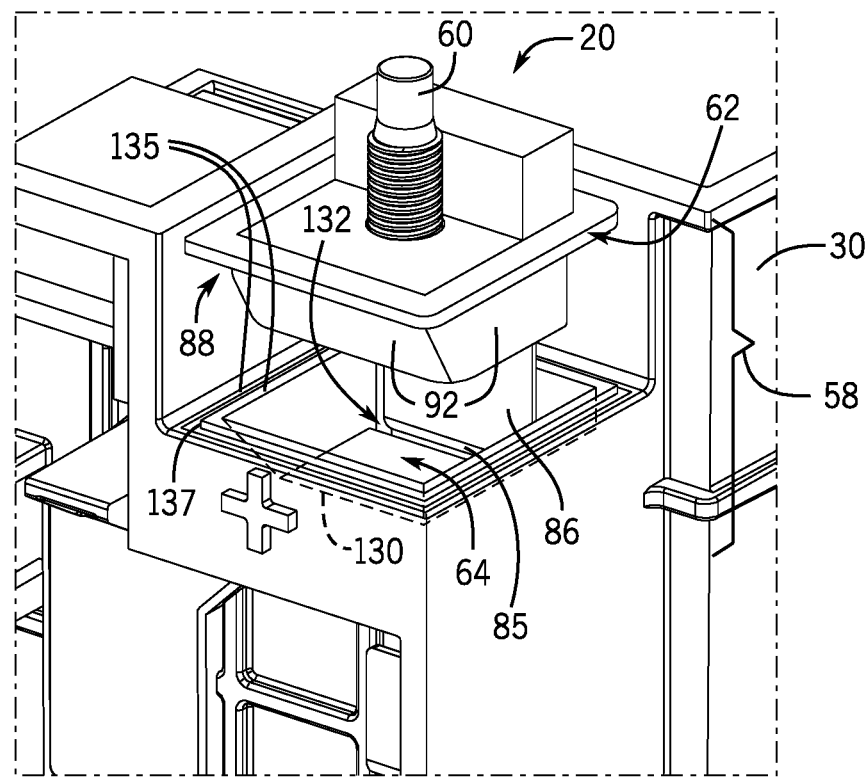
FIG. 8 is a perspective view of an embodiment of a receptacle of a housing receiving the terminal block assembly of FIG. 4, in accordance with embodiments of the present disclosure.
Figure 9:
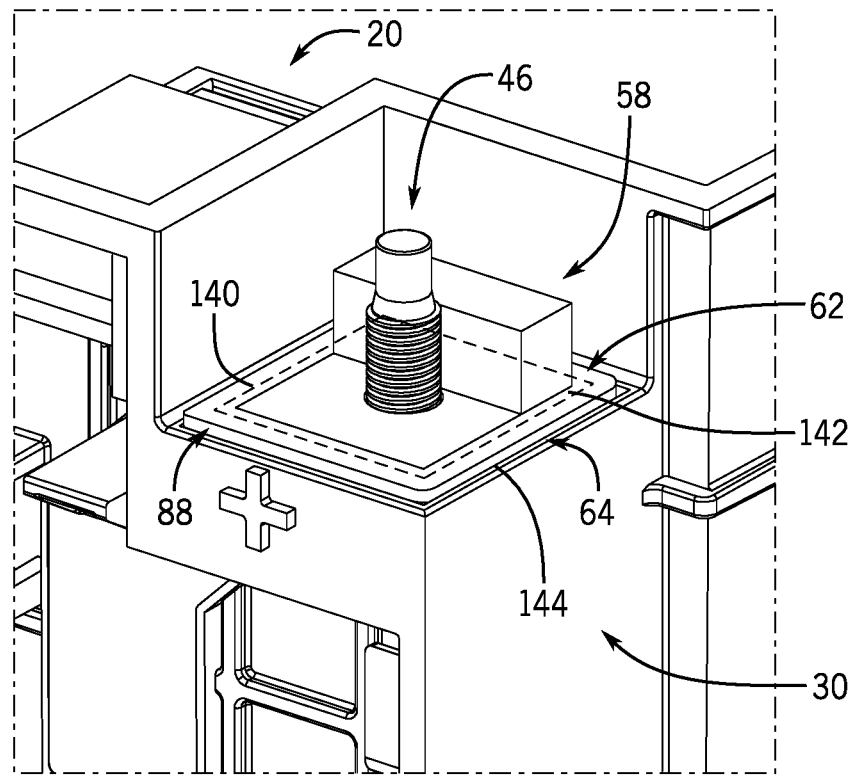
FIG. 9 is a perspective view of an embodiment of the terminal block assembly of FIG. 4 sealed within the receptacle of FIG. 8, in accordance with embodiments of the present disclosure.

Turning now to FIGS. 8 and 9, perspective views of the terminal block assembly 58 of FIGS. 4 and 5 being inserted into the receptacle 64 of the housing 30, and positioned within the receptacle 64 of the housing 30, respectively, are shown. Focusing first on the embodiment illustrated in FIG. 8, the receptacle 64 includes, as previously described, a slanted or tapered surface 130 corresponding with the slanted or tapered surface 92 of the polymer portion 62 of the terminal block assembly 58. Accordingly, the polymer portion 62 may be easily received by the receptacle 64, and the tapered surfaces 92, 130 may physically contact one another, or reduce an amount of space between the housing 30 and the plastic portion 72 of the terminal block assembly 58 to less than would otherwise be possible with, for example, a generally untapered terminal block assembly 58 and receptacle 64.

As shown in FIG. 8, the receptacle 64 designed to receive the terminal block assembly 58 may include an opening 132 that receives the extension 86 of the bus bar 66. Accordingly, the opening 132 may be offset to account for the curvature 85 in the bus bar 66 in order to properly receive the extension 86 of the terminal block assembly 58. Further, as described in detail below, the lip 88 of the polymer portion 62 may be welded or adhered to one or more surfaces 135 of the housing 30 (e.g., where the surface 135 surrounds the receptacle 64) to seal the terminal block assembly 58 within the receptacle 64. As shown, the lip 88 may weld to two surfaces 135 separated by a channel 137, where the channel 137 acts as a labyrinth to reduce a likelihood that fluids leak into, or out of, the receptacle 64.

Turning now to FIG. 9, the terminal block assembly 58 is shown sealed within the receptacle 64 of the housing 30 to form the major terminal 46 of the battery module 20. To seal the receptacle 64, the polymer portion 62 of the terminal block assembly 58 may be sealed (e.g., adhered, welded) to the housing 30. For example, as shown, the lip 88 of the polymer portion 62 may be welded to the housing 30 along a weld region 140 on an upper surface 142 of the polymer portion 62. In the illustrated embodiment, the lip 88 of the polymer portion 62 is welded along only one weld region 140. However, as described with respect to FIG. 8, the lip 88 of the polymer portion 62 may be welded to more than one surface of the housing 30 along multiple weld regions. In some embodiments, the polymer portion 62 and/or housing 30 may be additionally or alternatively sealed in other ways (e.g., by covering or welding over spaces 144 between the polymer portion 62 and the housing 30).

Figure 10:
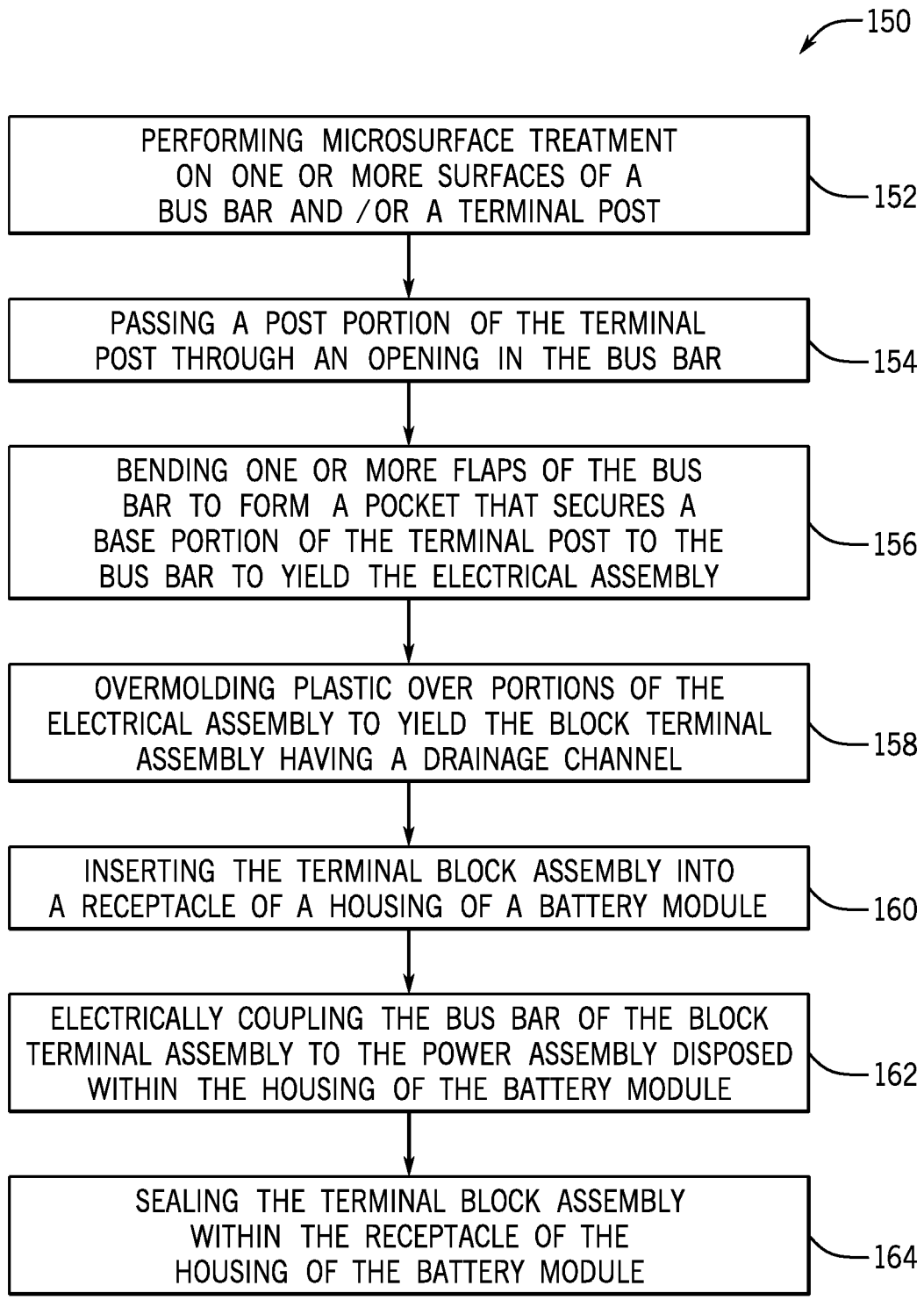
FIG. 10 is a flow diagram illustrating a process for manufacturing the battery module of FIG. 3, in accordance with embodiments of the present disclosure.

FIG. 10 is a flow diagram illustrating a process 150 for manufacturing a battery module 20, in accordance with embodiments of the present approach. It may be appreciated that, in other embodiments, certain steps may be performed in different orders, or certain steps may be skipped, in accordance with the present disclosure. The illustrated process 150 begins with performing (block 152) microsurface treatment on one or more surfaces of a bus bar 66 and/or a terminal post 60. As set forth above, in certain embodiments, the bus bar 66, the terminal post 60, or both may receive microsurface treatment over the entire surface of the metal parts, while in other embodiments, only the bonding portions 126 (e.g., including the underside of the base 76, inner and outer surfaces of the hairpin bend 84, inner and outer surfaces of the trough 80 of the bus bar 66) of the electrical assembly 120 may receive the microsurface treatment. For example, in certain embodiments, the entire surface of the bus bar 66 and the base portion of the terminal post 60 may receive the microsurface treatment to improve bonding with the polymer during the later overmolding step. In other embodiments, the microsurface treatment of block 152 may be skipped altogether.

Continuing through the illustrated process 150, the post portion 68 of the terminal post 60 is passed (block 154) through the opening 74 in the bus bar 66. As mentioned above, in certain embodiments that include the threaded post portion 68, the post portion 68 of the terminal post 60 may be threaded (e.g., twisted, rotated) through the opening 74 in the bus bar 66. Subsequently, one or more flaps 78 of the bus bar 66 are bent (block 156) to form a pocket 124 that secures the base portion 70 of the terminal post 60 to the bus bar 66, forming the electrical assembly 120 of the terminal block assembly 58. As mentioned above, when folded against the sides 72 of the base portion 70 of the terminal post 60, the pocket 124 formed by the flaps 78 blocks or prevents the terminal post 60 from rotating or moving, effectively securing the terminal post 60 to the bus bar 66.

Continuing through the illustrated process 150, next, polymer is overmolded (block 158) about portions of the electrical assembly 120 to yield the terminal block assembly 58. As mentioned above, polymer portions 62 of the terminal block assembly 58 may overmold a number of surfaces of the bus bar 66 and the terminal post 60. The polymer portion 62 may further secure the base portion 70 of the terminal post 60 within the pocket 124 to block or prevent the terminal post 60 from moving or rotating. The polymer portion 62 also overmolds at least a portion of the trough 80 of the bus bar 66 to yield the drainage channel 96 of the terminal block assembly 58, which promotes the drainage of fluids away from the terminal post 60, the electrochemical cells 32, and/or electrical circuitry of the battery module 20. Additionally, in certain embodiments, the polymer portion 62 may include a lip 88 that extends along the sides 90 of the terminal block assembly 58 to enable the assembly to be sealed within the receptacle 64 of the housing 30 of the battery module 20. Furthermore, as mentioned, the terminal block assembly 58 may include tapered side portions 92 that correspond to tapered side portions 130 of the receptacle 64 of the housing 30 to further enhance sealing between the terminal block assembly 58 and the housing 30. It may be appreciated that, in certain embodiments, the electrical assembly 120 may be held in a particular position and the entire housing 30 of the battery module 20, including the polymer portion 62 of the terminal block assembly 58, is overmolded around the electrical assembly 120, such that the housing 30 and the polymer portion 62 are made from one integral piece of polymer.

Next in the illustrated process 150, the terminal block assembly 58 may be inserted (block 160) into a corresponding receptacle 64 of a housing 30 of a battery module 20. For example, in certain embodiments, this may involve lowering the extension 86 of the bus bar 66 into the receptacle 64 first, then lowering the tapered sides 92 of the terminal block assembly 58 to meet corresponding tapered features 130 within the receptacle 64, until the lip 88 that extends from the sides 90 of the terminal block assembly 58 contacts the exterior surface 135 of the receptacle 64. Then, the bus bar 66 may be electrically coupled (block 162) to the power assembly 45 of the battery module 20. In certain embodiments, the bus bar 66 may be electrically connected to the power assembly 45 by the extension 86 of the bus bar 66 directly contacting a metallic slot within the receptacle upon the terminal block assembly 58 being loaded into the receptacle 64 of the battery module 20, wherein the metallic slot is electrically coupled to the power assembly 45 directly or indirectly (e.g., via a switch that can electrically disconnect the terminal block assembly 58 from the power assembly 45). In certain embodiments, the extension 86 of the bus bar 66 may be welded to a metal component (e.g., a minor bus bar or connector of the power assembly 45) that is electrically coupled (e.g., directly or indirectly) to the power assembly 45.

The illustrated process 150 concludes with the terminal block assembly 58 being sealed (block 164) within the receptacle 64 of the housing of the battery module 20. For example, the lip 88 of the terminal block assembly 58 may be sealed to the exterior surface 135 of the receptacle 64 using an adhesive, such as an epoxy resin or an adhesive strip. In other embodiments, the lip 88 of the of the terminal block assembly 58 may be welded (e.g., ultrasonically welded, laser welded) to the exterior surface 135 of the receptacle 64 to seal the terminal block assembly 58 within the receptacle 64.

Figure 11:
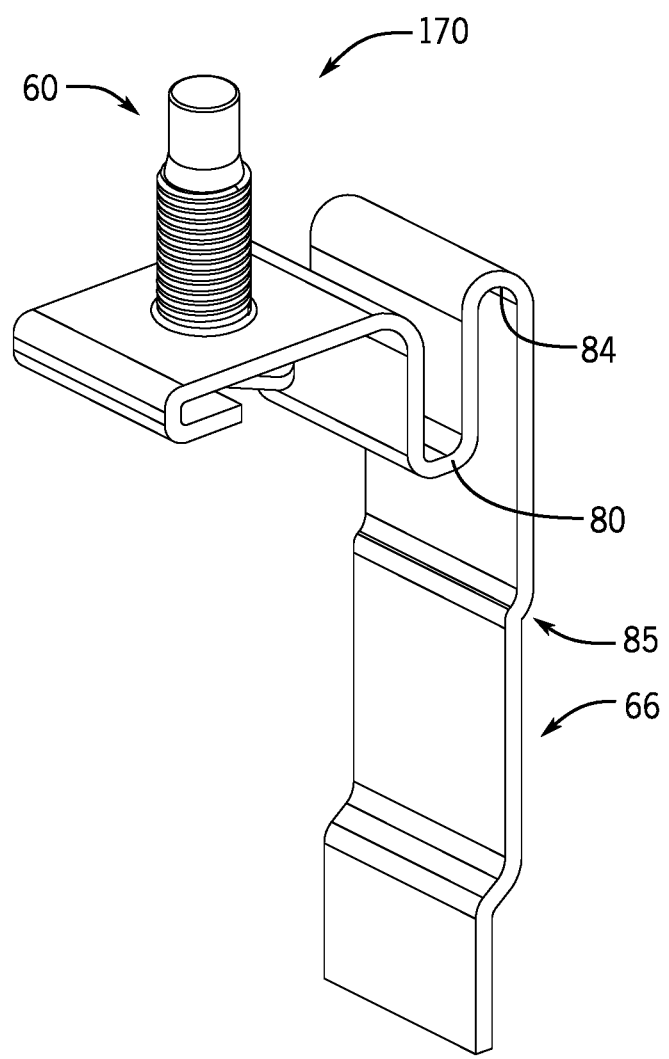
FIG. 11 is a perspective view of another electrical assembly design for the terminal block assembly, in accordance with embodiments of the present disclosure.
Figure 12:
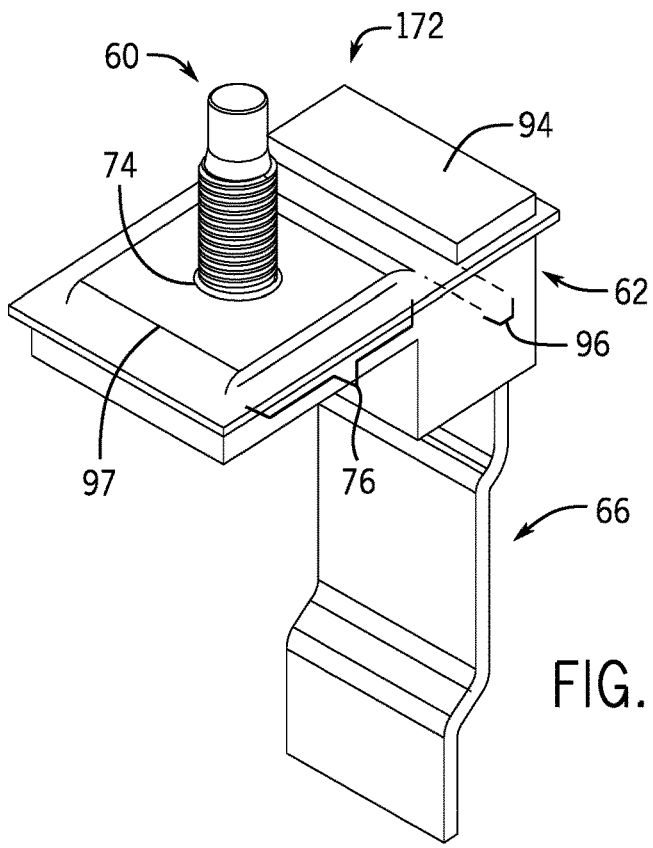
FIG. 12 is a perspective view of another embodiment of a terminal block assembly design, in accordance with embodiments of the present disclosure.
Figure 13:
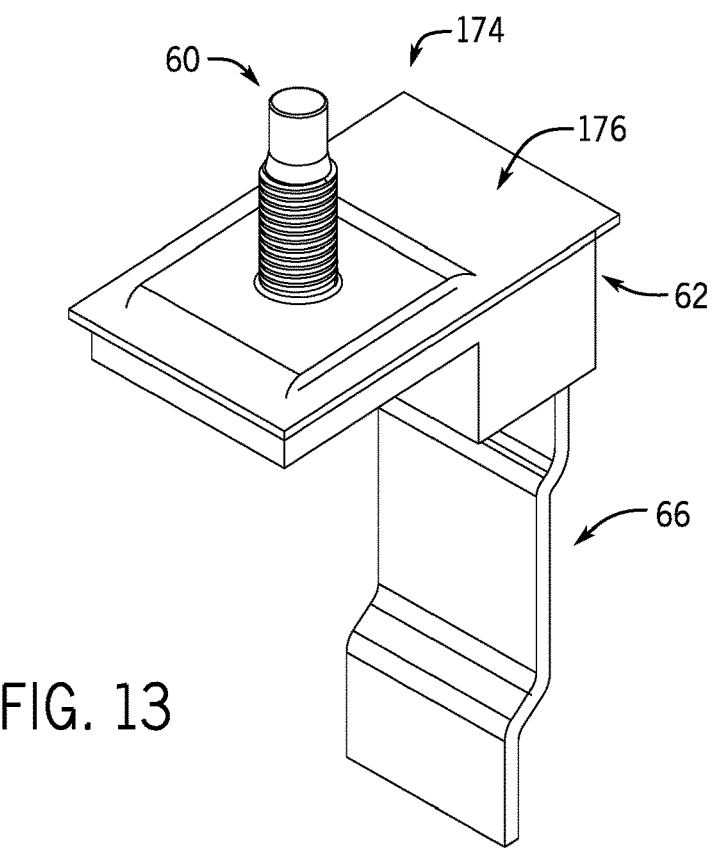
FIG. 13 is a perspective view of another terminal block assembly design, in accordance with embodiments of the present disclosure.

FIG. 11 is a perspective view of another embodiment of an electrical assembly 170 that can be used to manufacture embodiments of the terminal block assemblies 172 and 174 illustrated in FIGS. 12 and 13, respectively. The electrical assembly 170 illustrated in FIG. 11 includes a number of same features as the bus bar 66 discussed above, which will not be reiterated. Additionally, the bus bar 66 of the electrical assembly 170 illustrated in FIG. 11 also includes a deeper trough 80 (e.g., a U-shaped bend) disposed near the terminal post 60. Additionally, the bus bar 66 of the electrical assembly 170 also includes a hair-pin bend 84 (e.g., an elongated U-shaped) that extends in a direction opposite the trough 84 to a height approximately level or even with the base 76 of the bus bar 66. As such, once the electrical assembly 170 is overmolded, the height of the rectangular portion 94, as illustrated in FIG. 12, can be substantially reduced compared to the terminal block assembly 58 of FIG. 4. For example, the rectangular portion 94 of the terminal block assembly 172 of FIG. 12 is shorter, while still defining the drainage channel 96 near the terminal post 60. As illustrated in FIG. 13, in certain embodiments, the rectangular portion 94 may be eliminated altogether, resulting in a substantially smooth region 176 disposed near the terminal post 60. While terminal block assembly 174 illustrated in FIG. 13 lacks the drainage channel 96, it may be appreciated that the curved shape of the bus bar 66 of the electrical assembly 170 illustrated in FIG. 11 (e.g., curves 80, 84, and 85) still enable a tortuous path that blocks (e.g., resists, prevents) corrosion or unwanted contaminants (e.g., water, air, fluid) from creeping along the bus bar 66 and into the polymer housing 30 of the battery module 20.

One or more of the disclosed embodiments, alone or in combination, may provide one or more technical effects useful in the manufacture of battery modules, and portions of battery modules. In general, embodiments of the present disclosure include a terminal block assembly having a bus bar that envelops a base of a terminal post within a pocket of the bus bar, where the pocket is defined by flaps of the bus bar that bend around the base of the terminal post. The pocket and the base are overmolded by a polymer base of the terminal block assembly, which forms a drainage channel of the terminal assembly adjacent to the base of the bus bar. Overmolding the pocket and the base by the polymer base enhances an ability of the terminal post to resist rotation when a lead is engaged with the terminal post. Further, forming the terminal block assembly facilitates modular manufacturing of the terminal block assembly that can be easily positioned within a receptacle of a housing, such that the electrical components of the terminal block assembly electrically couple with the electrochemical cells of the battery module. The polymer base of the terminal block assembly may also be welded and sealed to the polymer housing. The drainage channel of the terminal block assembly directs moisture or fluid away from a major terminal of the battery module, which extends the life of the major terminal and associated electrical connectors and helps prevent fluids from entering the housing of the battery module. Accordingly, the terminal posts of the battery module are easily integrated in a way that reduces fluid ingress and egress to and from the housing battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:
1. A battery module, comprising:
a terminal block assembly that defines a major terminal of the battery module and that is secured to a polymer housing of the battery module, the terminal block assembly comprising:
a terminal post having a post portion and a base portion that extends outward from a central axis of the post portion;
a bus bar physically coupled to the base portion of the terminal post, wherein the bus bar is electrically coupled to a first plurality of cell terminals of a plurality of lithium ion battery cells disposed within a water-tight interior volume of the polymer housing, and wherein the bus bar includes a U-shaped trough disposed near the terminal post and a hairpin bend disposed adjacent to the U-shaped trough, wherein the hairpin bend extends in a direction opposite the U-shaped trough; and a polymer portion overmolding at least the U-shaped trough and the hairpin bend of the bus bar to form a drainage channel near the terminal post, and wherein the U-shaped trough is disposed near an interface between the polymer portion and an exposed base of the bus bar surrounding the terminal post, wherein the exposed base of the bus bar is not overmolded by the polymer portion.

2. The battery module of claim 1, wherein the bus bar, the terminal post, or a combination thereof, comprises a microsurface roughness on portions of the bus bar that are overmolded by the polymer portion of the terminal block assembly.

3. The battery module of claim 1, wherein the bus bar comprises copper, aluminum, nickel, stainless steel, or combinations thereof, and wherein the terminal post comprises copper, aluminum, nickel, stainless steel, or combinations thereof.

4. The battery module of claim 3, wherein the bus bar is made of a first metal and the terminal post is made of a second metal that is different than the first metal.

5. The battery module of claim 1, wherein the bus bar comprises an opening and one or more flaps surrounding the opening, wherein the post portion of the terminal post extends through the opening of the bus bar, and wherein the one or more flaps of the bus bar are bent around the base portion of the terminal post to retain the base portion within a pocket of the bus bar.

6. The battery module of claim 5, wherein the polymer portion of the terminal block assembly overmolds the base portion of the terminal post to further secure the terminal post within the pocket of the bus bar.

7. The battery module of claim 1, wherein the polymer portion comprises a lip that is sealed to an exterior surface of the polymer housing surrounding a receptacle of the polymer housing.

8. The battery module of claim 7, comprising a weld coupling the lip of the polymer portion with the exterior surface of the polymer housing surrounding the receptacle of the polymer housing.

9. The battery module of claim 1, wherein the polymer portion is integral with the polymer housing.

10. The battery module of claim 1, wherein the U-shaped trough, the drainage channel, or both, are configured to block fluids from collecting near the terminal post, or draining toward the electrochemical cells or electronic circuitry of the battery module.

11. A battery module, comprising:
a polymer housing defining a water-tight interior volume and a first receptacle;
a plurality of lithium-ion battery cells disposed within the water-tight interior volume of the polymer housing;
a first terminal block assembly sealed within the first receptacle of the polymer housing to define a first major terminal of the battery module, wherein the first terminal block comprises:
a first terminal post having a first post portion and a first base portion that extends outward from a central axis of the first post portion;
a first bus bar mechanically coupled to the first base portion, wherein the first bus bar includes a first U-shaped trough disposed near the first terminal post and a first hairpin bend that is disposed adjacent to the first U-shaped trough and that extends in a direction opposite the first U-shaped trough, and wherein the first bus bar is electrically coupled to the first plurality of cell terminals of the plurality of lithium-ion battery cells; and
a first polymer portion overmolding at least the first hairpin bend and the first U-shaped trough to form a first drainage channel near the first terminal post, wherein the U-shaped trough is disposed near an interface between the polymer portion and an exposed base of the bus bar surrounding the terminal post, wherein the exposed base of the bus bar is not overmolded by the polymer portion.

12. The battery module of claim 11, wherein the polymer housing defines a second receptacle, and wherein the battery modules comprises a second terminal block assembly sealed within the second receptacle of the polymer housing, wherein the second terminal block assembly comprises:
a second terminal post having a second post portion and a second base portion that extends outward from a central axis of the second post portion;
a second bus bar mechanically coupled to the second base portion, wherein the second bus bar includes a second U-shaped trough disposed near the second terminal post and a second hairpin bend that is disposed adjacent to the second U-shaped trough and that extends in a direction opposite the second U-shaped trough, and wherein the second bus bar is electrically coupled to a second plurality of cell terminals of the plurality of lithium-ion battery cells; and
a second polymer portion overmolding at least the second hairpin bend and the second U-shaped trough to form a second drainage channel near the second terminal post.

13. The battery module of claim 11, wherein the first post portion is a threaded post, a smooth post, or a flange.

14. The battery module of claim 11, wherein the first polymer portion includes tapered side portions, and wherein the first receptacle includes complementary tapered side portions to receive the tapered side portions of the first polymer portion.

15. The battery module of claim 1, comprising an additional terminal block assembly that defines a second major terminal of the battery module and that is secured to the polymer housing of the battery module, the additional terminal block assembly comprising:
a second terminal post having a second post portion and a second base portion that extends outward from a central axis of the second post portion;
a second bus bar physically coupled to the second base portion of the second terminal post, wherein the second bus bar is electrically coupled to a second plurality of cell terminals of the plurality of lithium ion battery cells disposed within the water-tight interior volume of the polymer housing, and wherein the second bus bar includes a second U-shaped trough disposed near the second terminal post and a second hairpin bend disposed adjacent to the second U-shaped trough, wherein the second hairpin bend extends in a direction opposite the second U-shaped trough; and
a second polymer portion overmolding at least the second U-shaped trough and the second hairpin bend of the second bus bar to form a second drainage channel near the second terminal post.

* * * * *